C. P. BYRNES.
APPARATUS FOR COOLING AUTOMOBILE TIRES.
APPLICATION FILED FEB. 18, 1915.
1,159,894.
Patented Nov. 9, 1915.
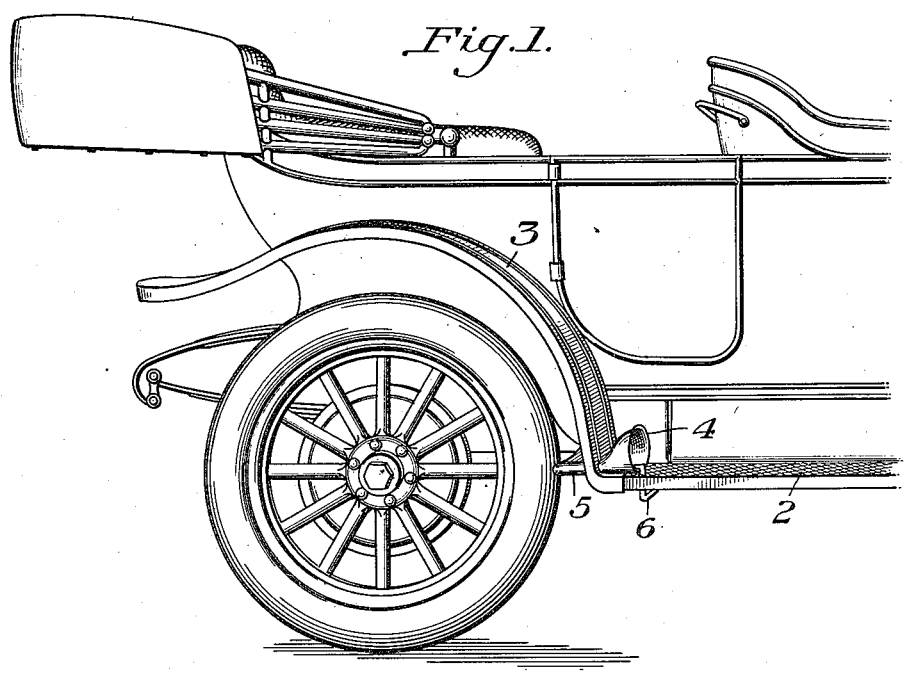
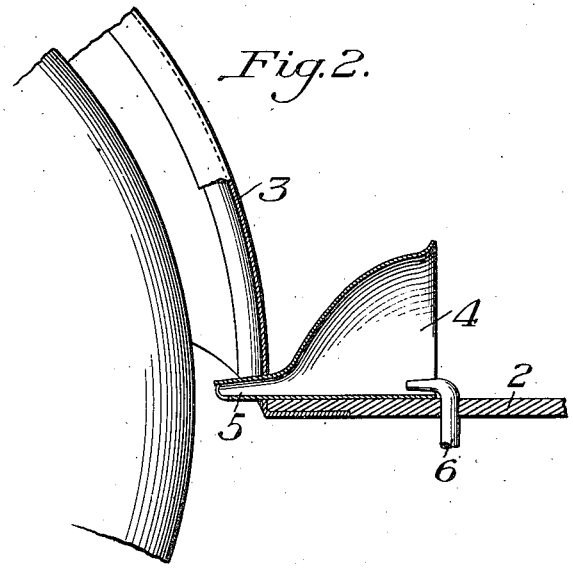
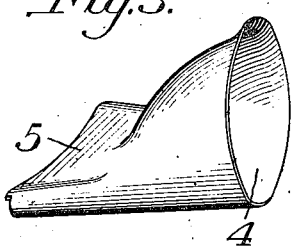
WITNESSES
INVENTOR

UNITED STATES PATENT OFFICE.

CLARENCE P. BYRNES, OF SEWICKLEY, PENNSYLVANIA.

APPARATUS FOR COOLING AUTOMOBILE-TIRES.

1,159,894.  Specification of Letters Patent.  Patented Nov. 9, 1915.

Application filed February 18, 1915. Serial No. 9,177.

*To all whom it may concern:*

Be it known that I, CLARENCE P. BYRNES, a citizen of the United States, residing at Sewickley, in the county of Allegheny and State of Pennsylvania, have invented a new and useful Improvement in Apparatus for Cooling Automobile-Tires, of which the following is a full, clear, and exact description, reference being had to the accompanying drawings, forming part of this specification, in which—

Figure 1 is a side elevation showing the rear portion of an automobile provided with my improved device. Fig. 2 is a partial longitudinal section, and Fig. 3 is a perspective view of the ventilator horn.

My invention relates to the cooling of automobile tires and is designed to provide a cheap, simple and efficient device therefor, which will avoid the complication and weight of water connections and will cool the tires by an air current formed by the movement of the vehicle.

In automobile tires having an outer tread or shoe and an inner pneumatic tube the heat set up in the tire during driving aids in causing blow-outs, sticking of the inner tube, etc. My invention is designed to reduce this trouble by driving against the tire a special current of air which is collected by the speed of the vehicle in a suitable ventilator or collecting device having an attachment which directs it against the wheel.

In the drawings wherein I show my invention as applied to the rear wheels of an automobile, 2 represents the running-board and 3 the rear wheel guard.

4 is a ventilator horn preferably arranged at the rear end of the foot or running-board and having a tapering flat tube portion 5 extending back through a slot in the wheel guard to within a suitable distance of the shoe of the pneumatic tire. This horn may be removably bolted or otherwise secured to the wheel guard or running-board, or both, so that it may be easily taken off if desired, leaving simply the narrow slot in the wheel guard.

When the car is driven forwardly, air enters the horn or collecting device, and as this air current flows rearwardly, its velocity will be increased by the decreasing area of the horn and directing tube. This current of air will carry away heat by convection and assist in keeping down the temperature of the tire. The velocity of the current will, of course, vary with the speed of the car, growing greater with the increasing velocity of the car.

In order to assist or supplement the action of the ventilator, I may provide a fan or power driven suction device which will drive a current of air through a tube, such as shown at 6, in case the car is traveling with the wind or a greater blast of air is desired. The power for driving the air-sucking or forcing device may be obtained from an electric motor on the car, or from a turbine or fan driven by the exhaust gases, or otherwise, as desired.

The advantages of my invention will be obvious since the forward movement of the vehicle will itself create the currents of air which are collected and driven against the wheels. The device may be applied to the rear wheels only and also to the front wheels, if desired. The form of air collector and directing device may be changed as well as its location and connections, without departing from my invention. The additional air blast from the power driven device may be applied either within the horn or at another point on the tire, if desired. The rear directing tube or channel may be terminated in an upwardly or downwardly inclined nozzle and this tube is preferably located where it is least liable to receive mud or foreign matter carried up by the wheel.

I claim:

1. The combination with an automobile, having pneumatic tires, of an air collecting device mounted thereon arranged to collect air under the forward movement of the car, and a directing channel leading from the collector to a point adjacent to a pneumatic tire to cool the same during the movement of the car; substantially as described.

2. The combination with an automobile having pneumatic tires, of an air collecting device mounted thereon arranged to collect air under the forward movement of the car, and a directing channel leading from the collector to a point adjacent to a pneumatic tire, said collecting device and channel having decreasing areas to increase the air velocity; substantially as described.

3. A vehicle having a wheel-guard system provided with a special air collector and director to direct air against the tire and cool the same; substantially as described.

4. The combination with an automobile having pneumatic tires with inner tubes, of a plurality of forwardly opening air collectors at the sides, each collector having a channel leading to a pneumatic tire on its side of the car to cool the same; substantially as described.

In testimony whereof, I have hereunto set my hand.

CLARENCE P. BYRNES.

Witnesses:
 L. H. JOHNSON,
 H. M. CORWIN.